(12) United States Patent
Youngren et al.

(10) Patent No.: US 8,473,402 B2
(45) Date of Patent: Jun. 25, 2013

(54) PERPETUAL FUTURES CONTRACTS WITH PERIODIC RECKONINGS

(75) Inventors: Steven A. Youngren, Elgin, IL (US);
Lori Aldinger, Naperville, IL (US);
John Nyhoff, Darien, IL (US); John Labuszewski, Westmont, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 0 days.

(21) Appl. No.: 13/086,874

(22) Filed: Apr. 14, 2011

(65) Prior Publication Data
US 2012/0265663 A1 Oct. 18, 2012

(51) Int. Cl.
*G06Q 40/00* (2012.01)

(52) U.S. Cl.
USPC .......................................................... 705/37

(58) Field of Classification Search
CPC ....................................................... G06F 17/60
USPC .................................................. 705/37, 36 R
See application file for complete search history.

(56) References Cited

U.S. PATENT DOCUMENTS

| | | | |
|---|---|---|---|
| 4,903,201 A | | 2/1990 | Wagner |
| 7,024,384 B2* | | 4/2006 | Daughtery, III ............. 705/36 R |
| 7,624,062 B1* | | 11/2009 | Kelly et al. ...................... 705/37 |
| 7,657,477 B1 | | 2/2010 | Chaffee |
| 7,747,499 B2* | | 6/2010 | McMurtray et al. ........ 705/36 R |
| 2004/0225593 A1* | | 11/2004 | Frankel et al. ................... 705/37 |
| 2006/0218075 A1* | | 9/2006 | Feldman et al. ................ 705/37 |
| 2007/0038533 A1* | | 2/2007 | Huff .................................. 705/35 |
| 2007/0055609 A1* | | 3/2007 | Whitehurst et al. ............ 705/37 |
| 2008/0033863 A1 | | 2/2008 | Simons et al. |
| 2009/0210336 A1* | | 8/2009 | Sankowski, II ................. 705/37 |
| 2010/0017321 A1 | | 1/2010 | Callaway et al. |
| 2011/0040671 A1 | | 2/2011 | Youngren et al. |

FOREIGN PATENT DOCUMENTS
WO WO 01/15044 * 3/2001

OTHER PUBLICATIONS

Lin et al.: Pricing of Perpetual American and Bermuda Options by Binomial Tree Method, Frontiers of Mathematics in China, 2007 2(2), pp. 243-256.*
Ciurlia et al.: A note on the pricing of perpetual continuous-installment options, May 2008, pp. 11-26.*
Shiller, Robert J.: Measuring Asset Values for Cash Settlement in Derivative Markets: Hedonic Repeated Measires Indices and Perpetual Futures, Jul. 1993, The Journal of Finance, vol. XLVIII, No. 3, pp. 911-931.*
PCT International Search Report dated Jul. 11, 2012, International Application No. PCT/US2012/033335, 17 pages.
Pricing of perpetual American and Bermudan options by binomial tree method, LIN, Jianwei and Liang Jin, Front. Math. Cinal 2007, 2(s), © Higher Education Press and Springer-Verlag 2007, pp. 243 through 256.

* cited by examiner

*Primary Examiner* — Bijendra K Shrestha
(74) *Attorney, Agent, or Firm* — Banner & Witcoff, Ltd.

(57) ABSTRACT

Systems and methods that provide for a perpetual futures/derivatives contract with periodic reckoning are disclosed. An embodiment may include a method of receiving a new perpetual contract and managing that contract through to its termination. The perpetual futures contract may comprise an option to terminate the contract at recurring predetermined intervals. The exchange may allow or prohibit exercise of the option based on particular parameters.

21 Claims, 4 Drawing Sheets

|  | Rolling Spot EUR/USD Contract | Rolling Spot USD/JPY Contract |
|---|---|---|
| Delivery | Delivery of EUR 12,500 vs. payment in USD | Delivery of USD 10,000 vs. payment in JPY |
| Quotation | In "American terms" or USD per 1 EUR, e.g., 1.3000 US dollars per Euro | In "European terms" or JPY per 1 USD, e.g., 93.00 Japanese yen per US dollar |
| Minimum Tick Size | 0.0001 USD/EUR (=$1.25) | 0.01 JPY/USD (=¥100) |
| Contract Value | If USD/EUR = 1.3000 then contract = $16,250 (=€12,500 x $1.3000/€) | If JPY/USD = 93.00 then contract = ¥930,000 (=$10,000 x 93.00¥/$) |
| Contract Months | Contracts are PERPETUAL in nature subject to quarterly opt-out provision as explained below | |
| Daily Interest Rate Adjustment | Swap points between "spot" and "next" transactions in each currency pairing determined daily by reference to spot/next spread as published reputable FX price reporting source to be determined If swap points between terms and base currency quoted at premium (discount), each long position is debited (credited) and each short position is credited (debited) said swap points. | |
| Quarterly Opt-Out | Longs and shorts have option of "opting-out" of Rolling Spot contracts on 2nd business day before 3rd Wednesday of March, June, September and December; except Rolling Spot USD/CAD contracts which provide for "opt-out" on 1st business day before 3rd Wednesday of March, June, September and December. Longs and shorts electing opt-out must submit Notice of Intention to Opt-Out to CME Clearing House; longs and shorts are matched for delivery. Any excess longs opting-out are matched to oldest outstanding short positions; any excess shorts opting-out are matched to oldest outstanding long positions. | |
| Trading Terminates | 2nd business day before 3rd Wednesday of contract month, except Rolling Spot USD/CAD contracts which terminates 1st business day before 3rd Wednesday of the contract month. | |
| Trading Hours | Traded exclusively on CME Globex® electronic trading platform on Sundays through Thursdays from 5:00 pm to 4:00 pm the following day (CT). On last day of trading, expiring contract terminates trading at 9:16 a.m. CT. | |

Forward Contracts on CME Group Rolling Spot FX Futures

|  | Rolling Spot EUR/USD Contract | Rolling Spot USD/JPY Contract | Rolling Spot GBP/USD Contract | Rolling Spot USD/CHF Contract | Rolling Spot USD/CAD Contract | Rolling Spot AUD/USD Contract |
|---|---|---|---|---|---|---|
| Delivery | Delivery of one (1) Rolling Spot EUR/USD Contract | Delivery of one (1) Rolling Spot USD/JPY Contract | Delivery of one (1) Rolling Spot GBP/USD Contract | Delivery of one (1) Rolling Spot USD/CHF Contract | Delivery of one (1) Rolling Spot USD/CAD Contract | Delivery of one (1) Rolling Spot AUD/USD Contract |
| Quotation | In "American terms", e.g., 1 EUR, e.g., 1.3000 US dollars per Euro | In "European terms", or JPY per 1 USD, e.g., 93.00 Japanese yen per US dollar | In "American terms", or USD per 1 GBP, e.g., 1.5000 US dollars per British pound | In "European terms", or CHF per 1 USD, e.g., 1.2000 Swiss francs per US dollar | In "European terms", or CAD per 1 USD, e.g., 1.2500 Canadian dollars per US dollar | In "American terms", or USD per 1 AUD, e.g., 0.6600 US dollars per Australian dollar |
| Minimum Tick Size | 0.0001 USD/EUR (=$1.25) | 0.01 JPY/USD (=¥100) | 0.0001 USD/GBP (=$0.625) | 0.0001 CHF/USD (=1.00 CHF) | 0.0001 CAD/USD (=1.00 CAD) | 0.0001 USD/AUD (=US$1.00) |
| Contract Value | If USD/EUR = 1.3000 then contract = $16,250 (=€12,500 x $1.3000/€) | If JPY/USD = 93.00 then contract = ¥930,000 (=$10,000 x 93.00¥/$) | If USD/GBP = 1.5000 then contract = $9,375 (=£6,250 x $1.5000/£) | If CHF/USD = 1.2000 then contract = 12,000 CHF (=$10,000 x 1.2000CHF/$) | If CAD/USD = 1.2500 then contract = 12,500 CAD (=$10,000 x 1.2500 CAD/USD) | If USD/AUD = 0.6600 then contract = USD $6,600 (=$10,000 AUD x USD $0.6600/AUD) |
| Forward Term | Forward contracts listed daily with terms of 1-week, 2-weeks, 1-month, 2-months and 3-months from current date |
| Trading Terminates | At 9:16 a.m. (CT) on termination date of forward contract |
| Trading Hours | Traded exclusively on CME Globex® electronic trading platform on Sundays through Thursdays from 5:00 pm to 4:00 pm the following day (CT). On last day of trading, expiring contract terminates trading at 9:16 a.m. (CT) |

PERPETUAL FUTURES CONTRACTS WITH PERIODIC RECKONINGS

TECHNICAL FIELD

The present disclosure relates to financial instruments and supporting systems. More particularly, the present disclosure relates to systems for handling perpetual futures contracts with periodic reckonings.

BACKGROUND

Chicago Mercantile Exchange pioneered the concept of rolling spot FX contracts in 1993. CME's goal at the time was to automate the one-day forward roll (of spot FOREX™ positions) without the back-office complications of arranging currency transfers. The original offerings were based on the British pound, Deutsche mark and Japanese yen, vs. the U.S. dollar. These contracts were sized at four times the standard CME FX futures contract and aimed at an institutional audience.

Rolling Spot futures were offered on the same 3-month cycle as other currency futures already listed by the CME at the time, with trading ending on the third Monday of March, June, September or December and delivery on the following Wednesday. These products deployed a feature such that the forward points associated with the contract would be debited or credited to the accounts of market participants. This feature was designed to insure that the contract would track spot price, eliminating the interest rate "carry" effect normally associated with futures or forward FX contract pricing. The products were traded from 1993 through about 1995.

However, the prior art contracts and corresponding systems are insufficient in various respects.

SUMMARY

The present disclosure overcomes limitations of the prior art by providing methods and systems that provide for a perpetual futures/derivatives contract with periodic reckoning.

An embodiment may include a method of receiving a new perpetual contract and managing that contract through to its termination. The method may include storing information associated with the perpetual futures contract. The perpetual futures contract may comprise an option to terminate the contract at recurring predetermined intervals. The exchange may allow or prohibit exercise of the option based on particular parameters. When the exchange receives notification of the exercise of the option, assuming the system is allowing the exercise of options to terminate at that time, the exchange (or a third-party computer system) may attempt to match the perpetual contract with another contract. Upon successful matching, the system may optionally transmit confirmation of the execution of the match.

Of course, the methods and systems of the above-referenced embodiments may also include other additional elements, steps, computer-executable instructions or computer-readable data structures. In this regard, other embodiments are disclosed and claimed herein as well. For example, the exchange computer system may comprise a computer processor and a tangible computer memory storing computer-executable instructions, which when executed by the processor, cause the exchange computer system to perform one or more of the steps described herein. The details of these and other embodiments of the present disclosure are set forth in the accompanying drawings and the description below. Other features and advantages of the disclosure will be apparent from the description and drawings and from the claims.

BRIEF DESCRIPTION OF THE DRAWINGS

The various aspects of the disclosure are illustrated by way of example and not limited in the accompanying figures in which like reference numerals indicate similar elements and in which:

FIG. 3 illustrates terms of various rolling spot FX contracts for use with embodiments in accordance with various aspects of the disclosure; and FIG. 4 illustrates terms of various forward contracts on various rolling spot FX futures contracts for use with embodiments in accordance with various aspects of the disclosure.

DETAILED DESCRIPTION

Figure 1:
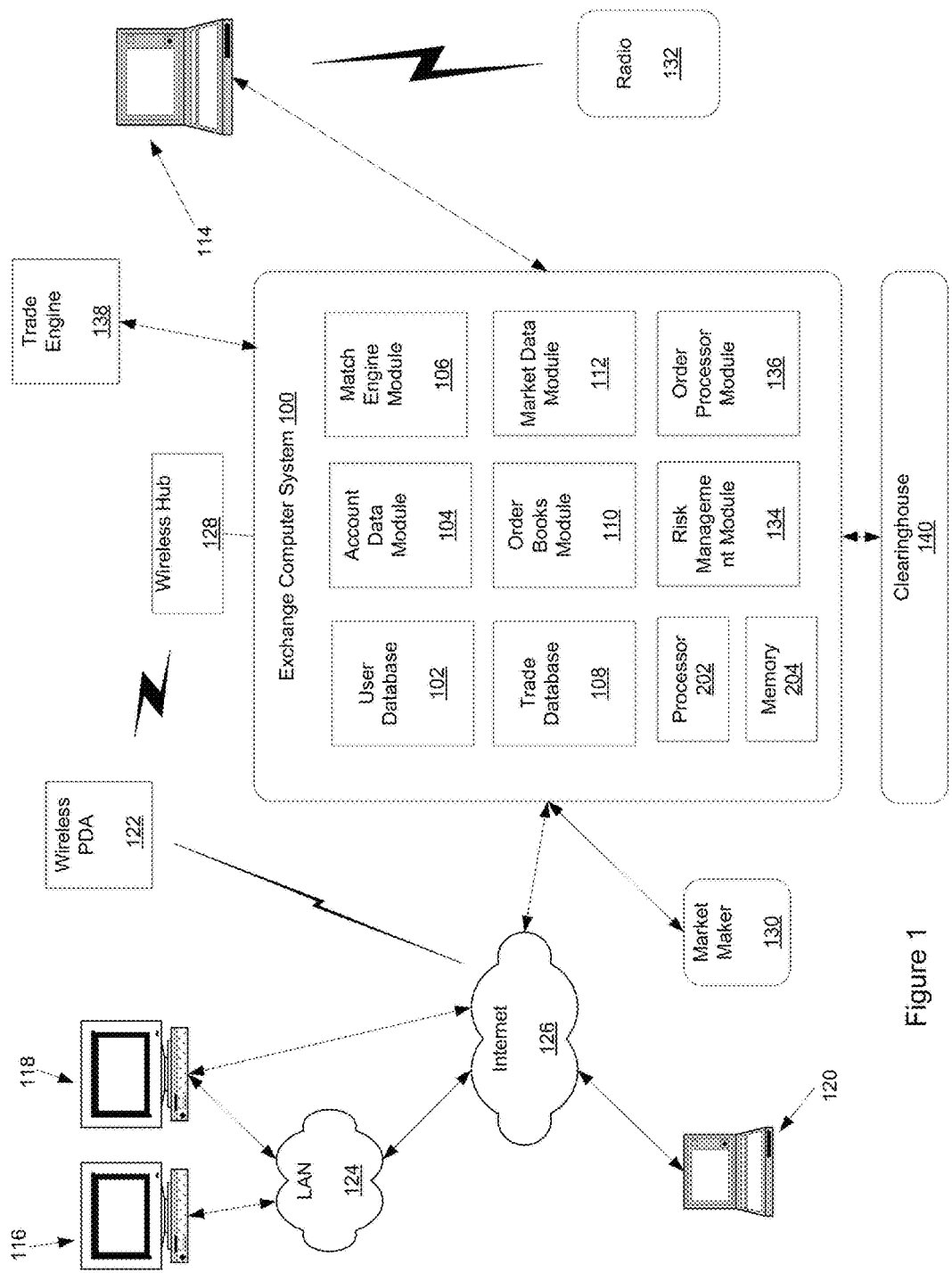
FIG. 1 shows a computer network system that may be used to implement various aspects of the embodiments disclosed in accordance with the disclosure.

The disclosure relates to a perpetual contract and system for implementing the same. The price of a futures or forward derivative contract reflects the spot price of the underlying item plus "cost of carry" or the costs associated with buying, holding and ultimately delivering the underlying item in satisfaction of the derivative contract. Many market participants, particularly retail traders, find it difficult to understand the differences associated with spot and futures/forward pricing models. Many would prefer to trade or invest in spot commodities or financial instruments while enjoying the leverage often offered by derivatives. Various aspects of the disclosure provide a means of joining the benefits of spot trading based on spot pricing, with the advantages of derivatives trading.

For example, the perpetual contracts described herein may, in some examples, utilize a daily forward point adjustment system designed to ensure that contract pricing reflects prevailing prices in interbank spot markets. The contracts described in this disclosure are perpetual in nature. In contrast, the pricing of the rolling spot FX contracts of the 1990s reflected spot pricing, and those contracts did expire and were not perpetual in nature. Unlike a futures contract with a single fixed delivery or cash-settlement date, the perpetual contracts described herein may be maintained indefinitely. Some futures contracts have offered relatively long-term expirations, e.g., five-years, but these contracts are not perpetual either. This disclosure describes a perpetual contract that is not finite in term. The periodic reckonings are a reference to a contract feature whereby market participants holding a long or short position in the contract may elect to exercise an option to exit the contract by either taking or making delivery, respectively, of the underlying item. This feature ensures that the perpetual contract will in fact reflect prevailing spot market pricing on those dates.

Derivative contracts such as futures contracts typically call for a cash settlement or delivery of a specific underlying item on some fixed future date or within a "window" of dates, i.e., they are finite in term. As a result, futures pricing typically reflects the "cost of carry" associated with buying, holding and delivering the underlying item in satisfaction of the expiring futures contract. Thus, futures prices may be at a significant premium or discount to the spot value of the underlying item, contingent upon market conditions. Although the perpetual derivatives contract does not expire, it does provide for a periodic (optional) delivery in order to provide a touchstone with spot pricing. This "opt-out" provision provides a firm touchstone with prevailing interbank FX market pricing.

This novel contract and system reflects spot pricing values instead of future or forward pricing. The periodic reckoning feature, combined with a daily cash pass-through feature ensures that the value of such contracts shall be firmly grounded by spot values of the underlying instrument. The exchange computer system 100 may include a "daily pass-through price adjustment" feature for perpetual contracts, whereby the daily cost of carry is either debited or credit to market participant's accounts. This feature ensures that the contract tracks spot pricing each and every day.

FIG. 1 depicts an illustrative operating environment that may be used to implement various aspects of the disclosure. The operating environment is only one example of a suitable operating environment and is not intended to suggest any limitation as to the scope of use or functionality of the various embodiment of the disclosure. Aspects of the present disclosure are preferably implemented with computing devices and networks for exchanging, transmitting communicating, administering, managing and facilitating trading information including, but not limited to performance bond amount requirements and trading information. An exchange computer system 100 receives market data, analyzes historical data, and calculates various values, e.g., performance bond amounts, in accordance with aspects of the disclosure.

Exchange computer system 100 may be implemented with one or more mainframes, servers, gateways, controllers, desktops or other computers. The exchange computer system 100 may include one or more modules, processors, databases, mainframes, desktops, notebooks, tablet PCs, handhelds, personal digital assistants, smartphones, gateways, and/or other components, such as those illustrated in FIG. 1. Moreover, computer system 100 may include one or more processors (e.g., Intel® microprocessor, AMD® microprocessor, risk processor, etc.) and one or more memories (e.g., solid state, DRAM, SRAM, ROM, Flash, non-volatile memory, hard drive, registers, buffers, etc.) In addition, an electronic trading system 138, such as the Globex® trading system, may be associated with an exchange 100. In such an embodiment, the electronic trading system includes a combination of globally distributed computers, controllers, servers, networks, gateways, routers, databases, memory, and other electronic data processing and routing devices. The trading system may include a trading system interface having devices configured to route incoming messages to an appropriate devices associated with the trading system. The trading system interface may include computers, controllers, networks, gateways, routers and other electronic data processing and routing devices. Orders that are placed with or submitted to the trading system are received at the trading system interface. The trading system interface routes the order to an appropriate device. A trading engine computer system 100 receives orders and transmits market data related to orders and trades to users.

A user database 102 may include information identifying traders and other users of exchange computer system 100. Such information may include user names and passwords. A trader operating an electronic device (e.g., computer devices 114, 116, 118, 120 and 122) interacting with the exchange 100 may be authenticated against user names and passwords stored in the user database 112. Furthermore, an account data module 104 may process account information that may be used during trades. The account information may be specific to the particular trader (or user) of an electronic device interacting with the exchange 100.

A match engine module 106 may match bid and offer prices for orders configured in accordance with aspects of the disclosure. Match engine module 106 may be implemented with software that executes one or more algorithms for matching bids and offers for bundled financial instruments in accordance with aspects of the disclosure. The match engine module 106 and trading system interface may be separate and distinct modules or component or may be unitary parts. Match engine module may be configured to match orders submitted to the trading system. The match engine module may match orders according to currently known or later developed trade matching practices and processes. In an embodiment, bids and orders are matched on price, on a FIFO basis. The matching algorithm also may match orders on a pro-rata basis or combination of FIFO and pro rata basis. Other processes and/or matching processes may also be employed.

Moreover, a trade database 108 may be included to store historical information identifying trades and descriptions of trades. In particular, a trade database may store information identifying or associated with the time that an order was executed and the contract price. The trade database 108 may also comprise a storage device configured to store at least part of the orders submitted by electronic devices operated by traders (and/or other users). A confirmation message may be sent when the match engine module 106 finds a match for an order and the order is subsequently executed. The confirmation message may, in some embodiments, be an e-mail message to a trader, an electronic notification in one of various formats, or any other form of generating a notification of an order execution.

Furthermore, an order book module 110 may be included to compute or otherwise determine current bid and offer prices. The order book module 110 may be configured to calculate the price of a financial instrument.

A market data module 112 may be included to collect market data and prepare the data for transmission to users. In addition, a risk management module 134 may be included in computer system 100 to compute and determine the amount of risk associated with a financial product or portfolio of financial products. An order processor module 136 may be included to receive data associated with an order for a financial instrument. The module 136 may decompose delta based and bulk order types for processing by order book module 110 and match engine module 106. The order processor module 136 may be configured to process the data associated with the orders for financial instruments.

The trading network environment shown in FIG. 1 includes computer (i.e., electronic) devices 114, 116, 118, 120 and 122. The computer devices 114, 116, 118, 120 and 122 may include one or more processors, or controllers, that control the overall operation of the computer. The computer devices 114, 116, 118, 120 and 122 may include one or more system buses that connect the processor to one or more components, such as a network card or modem. The computer devices 114, 116, 118, 120 and 122 may also include interface units and drives for reading and writing data or files. Depending on the type of computer device, a user can interact with the computer with a keyboard, pointing device, microphone, pen device or other input device. For example the electronic device may be a personal computer, laptop or handheld computer, tablet pc and like computing devices having a user interface. The electronic device may be a dedicated function device such as personal communications device, a portable or desktop telephone, a personal digital assistant ("PDA"), remote control device, personal digital media system and similar electronic devices.

Computer device 114 is shown directly connected to exchange computer system 100. Exchange computer system 100 and computer device 114 may be connected via a T1 line, a common local area network (LAN) or other mechanism for connecting computer devices. Computer device 114 is shown connected to a radio 132. The user of radio 132 may be a trader or exchange employee. The radio user may transmit orders or other information to a user of computer device 114. The user of computer device 114 may then transmit the trade or other information to exchange computer system 100.

Computer devices 116 and 118 are coupled to a local area network (LAN) 124. LAN 124 may have one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics or other media. Alternatively, a wireless personal digital assistant device (PDA) 122 may communicate with LAN 124 or the Internet 126 via radio waves. PDA 122 may also communicate with exchange computer system 100 via a conventional wireless hub 128. As used herein, a PDA includes mobile telephones and other wireless devices that communicate with a network via radio waves.

FIG. 1 also shows LAN 124 connected to the Internet 126. LAN 124 may include a router to connect LAN 124 to the Internet 126. Computer device 120 is shown connected directly to the Internet 126. The connection may be via a modem, DSL line, satellite dish or any other device for connecting a computer device to the Internet.

The operations of computer devices and systems shown in FIG. 1 may be controlled by computer-executable instructions stored on computer-readable storage medium. Embodiments also may take the form of electronic hardware, computer software, firmware, including object and/or source code, and/or combinations thereof. Embodiment may be stored on computer-readable media installed on, deployed by, resident on, invoked by and/or used by one or more data processors (e.g., risk processor), controllers, computers, clients, servers, gateways, networks of computers, and/or any combinations thereof. The computers, servers, gateways, may have one or more controllers configured to execute instructions embodied as computer software. For example, computer device 114 may include computer-executable instructions for receiving interest rate and other information from computer system 100 and displaying to a user. In another example, computer device 118 may include computer-executable instructions for receiving market data from computer system 100 and displaying that information to a user. In yet another example, a processor of computer system 100 may be configured to execute computer-executable instructions that cause the system 100 to calculate a performance bond amount required to balance risk associated with a portfolio.

One or more market makers 130 may maintain a market by providing bid and offer prices for a derivative or security to exchange computer system 100. Exchange computer system 100 may also exchange information with other trade engines, such as trade engine 138. One skilled in the art will appreciate that numerous additional computers and systems may be coupled to exchange computer system 100. Such computers and systems may include clearing, regulatory and fee systems, such as clearinghouse 140. Coupling can be direct as described or any other method described herein.

A clearinghouse 140 enables an exchange computer system 100 to provide contracts with a lower likelihood of default than over-the-counter (OTC) products. A clearinghouse 140 arranges for transactions to be settled and cleared. Clearing is the procedure through which a clearinghouse 140 becomes buyer to each seller of a contract (e.g., futures contract, equities, currencies, interest rate products, etc.), and seller to each buyer, and assumes responsibility for protecting buyer and seller from financial loss by assuring performance on each contract. A clearinghouse 140 may settle trading accounts, clear trades, collect and maintain performance bond funds, regulate delivery and report trading data. In some scenarios an exchange may operate its own clearinghouse 140 through a division of the exchange through which all trades made are confirmed, matched, and settled each day until offset or delivered. Alternatively, one or more other companies may be provided the responsibility of acting as a clearinghouse 140 with the exchange (and possibly other exchanges). An exchange may have one or more clearinghouses associated with the exchange. An exchange may offer firms qualified to clear trades to provide a clearinghouse 140 for the exchange computer system 100. In some instances, these clearing members may be designated into different categories based on the type of commodities they can clear and other factors.

The clearinghouse 140 may establish minimum performance bond (i.e., margin) requirements for the products it handles. A customer may be required to deposit a performance bond with the clearinghouse 140 (or designated account) for the purpose of insuring the clearinghouse 140 against loss on open positions. The performance bond helps ensure the financial integrity of brokers, clearinghouses, and exchanges as a whole. If a trader experiences a drop in funds below a minimum requirement, the clearinghouse 140 may issue a margin call requiring a deposit into the margin account to restore the trader's equity. A clearinghouse 140 may charge additional performance bond requirements at the clearinghouse's discretion. For example, if a clearinghouse's potential market exposure grows large relative to the financial resources available to support those exposures, the clearinghouse 140 may issue a margin call.

In another embodiment, the clearinghouse 140 may require a larger performance bond based on a credit check (e.g., an analysis of the credit worthiness, such as using a FICO™ or comparable score, inter alia) of the customer/trader. The credit check may be performed (i.e., initiated) by a clearinghouse 140 or an exchange 100. In the example where the clearinghouse 140 performs the credit check, the clearinghouse 140 may send a message (e.g., enforcement message) to the exchange 100. If the credit check indicates that a customer/trader is a high risk, the enforcement message may increase the margin requirements of the customer/trader, or otherwise adjust the capabilities/constraints of the customer/trader commensurate with the higher risk. In the example where the exchange 100 initiates the credit check, the exchange 100 may send a message to one or more clearinghouses associated with the exchange 100 to update them on the increased/decreased risk associated with the customer/trader.

In recognition of the desire to promote efficient clearing procedures and to focus on the true intermarket risk exposure of clearinghouses, a cross-margining system may be used. By combining the positions of joint and affiliated clearinghouses in certain broad-based equity index futures and options into a single portfolio, a single performance bond requirement across all markets may be determined. The cross-margining system may greatly enhance the efficiency and financial integrity of the clearing system.

The principal means by which a clearinghouse 140 mitigates the likelihood of default is through mark-to-market (MTM) adjustments. The clearinghouse 140 derives its financial stability in large part by removing debt obligations among market participants as they occur. Through daily MTM adjustments, every contract is debited or credited based on that trading session's gains or losses. For example, as prices move for or against a position, funds flow into or out of the trading account. This cash flow is known as settlement variation.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may be connected by numerous alternative topologies.

Figure 2:
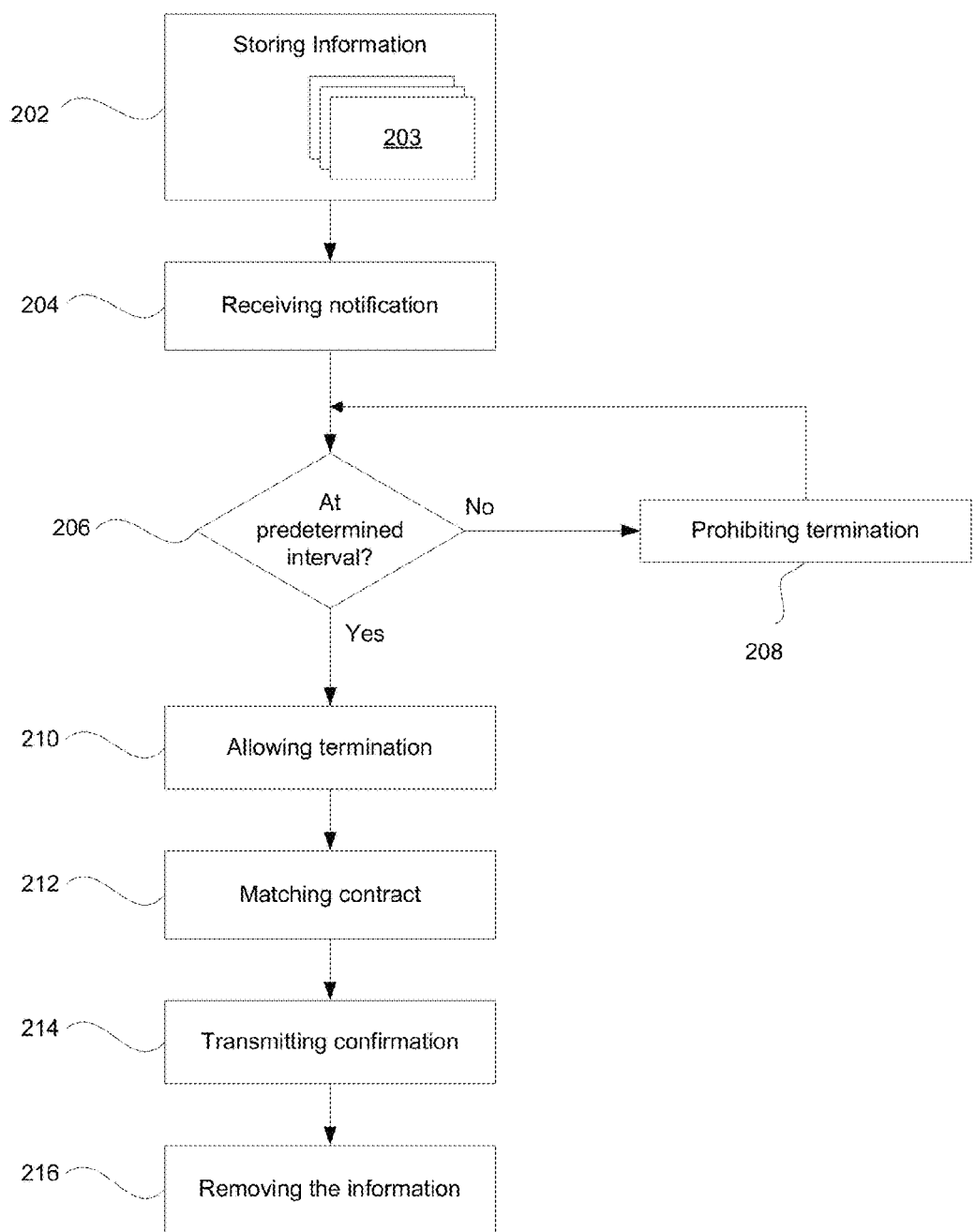
FIG. 2 is a flowchart illustrating various steps that may be performed in accordance with aspects of the disclosure.

FIG. 2 is a flowchart illustrating various steps that may be performed in accordance with aspects of the disclosure. In step 202, the exchange computer system 100 may store information 203 associated with a perpetual contract (e.g., perpetual derivative contract, perpetual futures contract, etc.) in accordance with various aspects of the disclosure. In some embodiments, step 202 may further comprise steps of storing particular information about the perpetual contract being handled by the exchange computer system 100. For example, the system 100 may also store the identity of a first party to the contract, the identity of a second party to the contract (e.g., a third party, a central counterparty such as a clearinghouse, etc.), and the notional amount of the contract. The disclosure contemplates that other information associated with the contract may also be stored, including, but not limited to reference entity identifier, contract type (e.g., derivative, credit default swap, futures, etc.), plurality of dates when an option to exercise the termination of the contract is permitted, and price. In some examples, the amount of the contract may be specific to a particular commodity (e.g., pork barrels, bushels of wheat, etc.) or to a particular financial instrument (e.g., XYZ corporation, ABC currency, etc.) Furthermore, in some embodiments, the exchange computer system may also identify the predetermined interval at which an option to terminate the perpetual contract may be exercised. For example, the exchange computer system 100 may refer to a reference source (e.g., a chart, database, etc.) to identify, for a particular perpetual contract or perpetual contract type, the associated predetermined interval at which holders of the contract may exercise their option to exit (e.g., terminate) the contract. Thus, when the new perpetual contract is entered into the exchange, the computer system 100 may identify the terms of the allowed periodic reckoning and store that information for use in prohibiting or allowing the termination of the contract.

The perpetual contract may comprise an option to terminate the contract at recurring predetermined intervals. As such, in step 206, the exchange computer system 100 may determine, on an ongoing basis, when a predetermined interval (e.g., 1 hour, 1 business day, 4 months, a quarter of a year, etc.) has been completed. At the recurring predetermined intervals, the exchange computer system 100 may allow (in step 210) an option to be exercised to terminate the contract. At all other times, the exchange computer system 100 may prohibit (in step 208) the contract from being terminated (e.g., prevent the option from being exercised.) The prohibition may take the form of an error message or alert if a request is made to terminate the perpetual contract outside of the allowed time (or time period). In another example, elements on a graphical user interface (GUI) may be disabled (e.g., grayed out) where functionality is prohibited, but then activated (e.g., highlighted) when the functionality is permitted.

Given the perpetual nature of the contract, a fixed expiration date may be absent from the perpetual contract. As such, the aforementioned intervals may recur (e.g., repeat) at predetermined time intervals into perpetuity. In other words, the perpetual contract does not have a fixed lifetime. In contrast to prior art futures contracts that expire after a predetermined time period, a perpetual futures contract continues into perpetuity absent extenuating circumstances (e.g., bankruptcy, dissolution, etc.)

When a holder of a perpetual contract desires to terminate (e.g., settle) the contract after a particular predetermined interval, a remote user terminal (e.g., computing device 120) may request the exercise of the option to terminate. As a result, either directly or indirectly, exchange computer system 100 may receive notification (in step 204) of the exercise of the option. The notification may be generated through one or more of various means. For example, the notification may be generated at a user's terminal. A user may select elements (e.g., dropdown box, radio button, checkbox, etc.) on a graphical user interface (GUI) to indicate a desire to terminate the position of their perpetual contract. In another example, the notification may be generated in an automated fashion based on triggers preset by a holder of the contract (e.g., sell at the next immediate predetermined interval after the underlying instrument of the contract, such as bushels of corn, reaches a threshold price.) In at least one embodiment in accordance with various aspects of the disclosure, notifications may serve as a declaration on the part of the holder of a perpetual contract of their intent to exercise their option to exit (e.g., opt-out) the perpetual contract. Such notifications may serve the additional utility of providing contract administrators with advance notice that the matching of particular quantities of contracts (see e.g., step 212, FIG. 2) will be required.

As explained above, the exchange computer system 100 may prohibit (in step 208) or allow (in step 210) the exercise of the option to terminate based on whether a predetermined time interval has elapsed (i.e., per the information associated with the perpetual contract, the current time/date is a reckoning period.) For example, the exchange computer system 100 may allow the exercise of options to terminate the contract at a first date (e.g., January 1), subsequent second date (e.g., April 1), a subsequent third date (e.g., September 1), and so on. In other words, the particular contract of the example may be configured to permit termination (e.g., opt out of the contract) only at the beginning of each quarter year. While predetermined time intervals have been described in the aforementioned embodiment, one skilled in the art after review of the entirety disclosed herein will appreciate that other conditions may be placed on whether an option to terminate may be exercised (e.g., whether the exerciser is in good standing, etc.) and such conditions are contemplated by the various embodiments of the disclosure.

In step 212, the perpetual contract corresponding to the exercised option, which was allowed in step 210, may be matched with another contract having a position opposite (e.g., counter) to it. For example, if the perpetual contract represented a long position on a particular futures contract, then the matching contract will represent a short position of the same or greater magnitude for the same particular futures contract. Of course, situations may arise where there are more longs electing to opt-out (e.g., exercise the option to terminate the contract) than shorts or vice versa. In one embodiment in accordance with various aspects of the disclosure, excess longs or short may simply not be allowed to exit the perpetual contract at the current opt-out date when such market illiquidity exists. In another embodiment, any excess longs electing to opt-out might be matched up with the oldest outstanding short positions, while any excess shorts opting-out may be matched to oldest outstanding long positions. In yet another embodiment, any excess longs (or shorts) may be matched up with randomly selected shorts (or longs).

In some embodiments in accordance with various aspects of the disclosure, the matching in step 212 may be performed by the exchange computer system (e.g., using match engine module 106). Alternatively, the matching in step 212 may be performed by a third-party computer system in communication with the exchange. At least one benefit of using a third-party system for matching is the reduced load on the exchange computer system 100. In addition, the matching in step 212 may occur between a perpetual contract and another perpetual contract, or a perpetual contract and a non-perpetual (i.e., traditional) contract. One skilled in the art will appreciate after review of the entirety disclosed herein that the matching step 212 is similar regardless of whether the computer system implements/accepts/handles perpetual contracts or non-perpetual (i.e., with a fixed expiration date) contracts.

In step 214, in some embodiments, a confirmation of a successful match may be to the remote user terminal (e.g., computing device 120). In other embodiments, the confirmation message may be suppressed, either partially or completely, based upon preferences (e.g., contract party preferences, etc.) The confirmation may serve as notice that the desire to exercise the option to terminate was successful and a match for the perpetual contract was found and the contract terminated.

Perpetual contracts, in some embodiments in accordance with various aspects of the disclosure, may be terminated through either cash settlement or physical delivery. For example, upon termination, a perpetual futures contract may be processed as a typical futures contract in that the conclusion of the contract results in the settlement of the contract terms. For example, the parties may agree on a time/place for delivery of a commodity (e.g., goods, such as wheat, pork, etc.). In another example, one party may transfer cash to another party (i.e., cash settlement).

In step 216, the exchange computer system 100 may remove from its computer memory the information associated with a terminated perpetual contract after that contract has been "opted out" and successfully matched (in step 212).

In one example in accordance with various aspects of the disclosure, a perpetual contract may be created in the currency markets. Although in this example, the perpetual contract has been described in the context of currency markets, the disclosure contemplated perpetual contracts in other contexts, including, but not limited to, interest rates, equities, commodities, and other derivative contracts on other underlying items.

To ensure that pricing of the perpetual contracts reflect prevailing prices in, for example, interbank FX (i.e., currency) markets, an exchange computer system 100 may employ a "daily point adjustment" approach. In one example in accordance with various embodiments, the pricing may occur on a daily basis using daily forward point adjustments. This pricing approach may include some similarities to the rolling spot FX futures adjustments. However, unlike in the Rolling Spot FX futures system, where contracts are finite in nature and expire in the months of March, June, September, and December (i.e., quarterly)," perpetual contracts have no preset expiration date.

In one example, the exchange computer system 100 may price the perpetual FX contracts using forward point adjustments. The pricing may be performed by one or more modules of exchange computer system 100. At least one benefit of the exchange computer system 100 described in various embodiments of the disclosure is that in the absence of a perpetual contract, as described herein, an exchange computer system 100 may be compelled to list derivatives with multiple expirations, possibly confusing prospective market participants. In various embodiments of the disclosure, market data module 112 may provide market data for perpetual contracts without the added layer of confusion relating to multiple expiration dates and schedules.

To better ensure alignment between pricing in the novel derivatives contract with prices prevailing in the associated spot markets, the perpetual contracts may include an opt-out provision. Longs and shorts in the novel contracts may enjoy the option of "opting-out" of their positions on a periodic basis. In some instances, the spot price may not accurately reflect a futures price because the spot price may not accurately consider the "cost of carry." For example, the "cost of carry" for a futures contract involving bushels of corn includes storage fees for storing the commodity product until physical delivery date/time is agreed upon at settlement.

A user (e.g., trader) in interbank foreign exchange (FX or Forex) markets seeking to maintain current currency exposures may "roll over" spot positions using FX swap transactions. Users who are long spot currency might execute a roll by selling the currency on a spot basis; and, simultaneously buying it on a forward basis. Users who want to roll a short position may buy on a spot basis, simultaneously selling on a forward basis. These transactions commit the counterparties to the actual exchange of two currencies on a specific date, at a mutually agreed exchange rate, and, a subsequent reversal of the transaction in the future at a different mutually agreed exchange rate. If these transactions are executed on a "spot/next" basis, then this means that the first transaction is consummated with the actual exchange of currency on the spot value date, typically two business days prior to the date on which the transaction is executed (a "spot" exchange). The subsequent reverse transaction is consummated on the next business day (a "next" day exchange).

Pricing of a "spot/next" swap of this nature (i.e., "roll pricing") generally reflects the relationship between interest rates associated with deposits in the two currencies. Assume that a user wishes to quote an exchange rate between U.S. dollars and Euros in terms of USD per EUR. As such, USD is the "terms" currency and EUR is the "base" currency. The forward price may be calculated using the following formula:

$$\text{Forward Price} = \text{Spot Price} \times \left( \frac{1 + \left[ R_{term} \times \left( \frac{d}{360} \right) \right]}{1 + \left[ R_{base} \times \left( \frac{d}{360} \right) \right]} \right)$$

For example, assume that the spot exchange rate equals $1.25/€; the U.S. interest rate is 0.50% and the European interest rate is 2.00%. The forward rate may be calculated as follows at $1.25005208/€. The −$0.00005208 difference between spot and forward prices ($1.24994792 less $1.25000000) is referred to as "forward points."

$$\text{Forward Price} = 1.25000000 \times \left( \frac{1 + \left[ 0.50\% \times \left( \frac{1}{360} \right) \right]}{1 + \left[ 2.00\% \times \left( \frac{1}{360} \right) \right]} \right) = 1.24994792$$

Note further that −$0.00005208 equates to −$0.65 based upon a €12,500 unit (=−$0.00005208×€12,500).

Pursuant to the aforementioned system, swap points between "spot" and "next" transactions in each currency pairing may be determined daily. These points may be determined based on a survey of market conditions, similar to the known rolling spot FX procedure. Alternatively, the spot/next spread may be referenced as published by a price reporting source (e.g., Bloomberg, etc.)

If swap points between terms and base currency are quoted at premium (discount), each long position may be debited (credited) and each short position may be credited (debited) said swap points. For example, per the above example in the context of currency markets, forward points are running at a premium to spot. Thus, long EUR/USD positions may be credited $0.65. Similarly, short EUR/USD positions would be debited $0.65 on that day.

FIG. 3 illustrates terms (see reference 300) of various rolling spot FX contracts for use with embodiments in accordance with various aspects of the disclosure. Regarding the "opt-out" feature, FIG. 3 explains that long and short positions have the option of "opting-out" of rolling spot contracts on particular business days. Moreover, long and short positions electing opt-out must, in some embodiments, submit a notification (e.g., a Notice of Intention to Opt-Out), so that the positions may be matched for delivery, e.g., any excess longs opting-out may be matched to oldest outstanding short positions and any excess shorts opting-out may be matched to oldest outstanding long positions.

In addition to EURO-US and US-JPY rolling spot contracts, the disclosure also contemplates perpetual contracts between various other currencies and other financial instruments:

|  | Rolling Spot GBP/USD Contract | Rolling Spot USD/CHF Contract | Rolling Spot USD/CAD Contract | Rolling Spot AUD/USD Contract |
|---|---|---|---|---|
| Delivery | Delivery of GBP 6,250 vs. payment in USD | Delivery of USD 10,000 vs. payment in CHF | Delivery of USD 10,000 vs. payment in CAD | Delivery of AUD 10,000 vs. Payment in USD |
| Quotation | In "American terms" or USD per 1 GBP, e.g., 1.5000 US dollars per British pound | In "European terms" or CHF per 1 USD, e.g., 1.2000 Swiss francs per US dollar | In "European terms" or CAD per 1 USD, e.g., 1.2500 Canadian dollars per US dollar | In "American terms" or USD per 1 AUD, e.g., 0.6600 US dollars per Australian dollar |
| Minimum Tick Size | 0.0001 USD/GBP (=$0.625) | 0.0001 CHF/USD (=1.00 CHF) | 0.0001 CAD/USD (=1.00 CAD) | 0.0001 USD/AUD (=US$1.00) |
| Contract Value | If USD/GBP = 1.5000 then contract = $9,375 (=£6,250 × $1.5000/£) | If CHF/USD = 1.2000 then contract = 12,000 CHF (=$10,000 × 1.2000 CHF/$) | If CAD/USD = 1.2500 then contract = 12,500 CAD (=$10,000 × 1.2500 CAD/USD) | If USD/AUD = 0.6600 then contract = USD $6,600 (=10,000 AUD × USD $0.6600/AUD) |

In addition, FIG. 4 illustrates terms (see reference 400) of various forward contracts on various rolling spot FX futures for use with embodiments in accordance with various aspects of the disclosure.

Embodiments of the disclosure can be extended for any market, future, option, forward or other financial instrument or investment vehicle. It is contemplated that financial instruments and investment vehicles herein are interrelated. For example, it is contemplated that traders may use equities and currency in a risk offsetting manner as would be appreciated by those in the art. Other examples include incidents such as a stock and an index. In addition, one or more features of the rolling spot FX futures contract systems may be employed as appropriate.

The disclosure has been described herein with reference to specific exemplary embodiments thereof. It will be apparent to those skilled in the art after review of the entirety disclosed herein, that a person understanding this disclosure may conceive of changes or other embodiments or variations, which utilize the principles of this disclosure without departing from the broader spirit and scope of the disclosure as set forth in the appended claims. All are considered within the sphere, spirit, and scope of the disclosure. For example, aspects of the disclosure are not limit to implementations that involve the trading of derivative products or futures products. Those skilled in the art will appreciate that aspects of the disclosure may be used in other markets.

What is claimed is:

1. A method comprising:

storing, by an exchange computer system comprising one or more computers, information associated with perpetual futures contracts, wherein the stored information comprises information indicating allowable termination times;

receiving, by the exchange computer system, notifications of intent to terminate a portion of the perpetual futures contracts, wherein each perpetual futures contract in a first subset of the portion represents a first position and each perpetual futures contract in a second subset of the portion represents a second position, wherein the first position is one of a long or a short position and the second position is the other of a long or a short position, and wherein there are more perpetual futures contracts in the first subset than in the second subset;

determining, by the exchange computer system, that each of the notifications represents an intent to terminate a perpetual futures contract on a current opt-out date that corresponds to an allowable termination time;

matching each of the perpetual futures contracts in the second subset with one of the perpetual futures contracts in the first subset, thereby leaving one or more excess perpetual futures contracts of the first subset not matched against a perpetual futures contract of the second subset;

performing, by the exchange computer system, one of the following with regard to each of the excess perpetual futures contracts
  (i) not permitting the excess perpetual futures contract to terminate on the current opt-out date, or
  (ii) permitting the excess perpetual futures contract to terminate on the current opt-out date and matching the excess perpetual futures contract with one of the oldest perpetual futures contracts representing the second position, or
  (iii) permitting the excess perpetual futures contract to terminate on the current opt-out date and matching the excess perpetual futures contract with a randomly selected one of the perpetual futures contracts representing the second position; and transmitting, by the exchange computer system, confirmations of the matches.

2. The method of claim 1, wherein the allowable termination times recur at predetermined time intervals into perpetuity, and fixed expiration dates are absent from the perpetual futures contracts.

3. The method of claim 1, wherein the storing the information associated with each of the perpetual futures contracts comprises:

storing, by the exchange computer system, an identity of a first party to the perpetual futures contract;

storing, by the exchange computer system, an identity of a second party to the perpetual futures contract; and storing, by the exchange computer system, a notional amount of the perpetual futures contract.

4. The method of claim 3, wherein the storing the information associated with each of the perpetual futures contracts comprises:

identifying the allowable termination times.

5. The method of claim 1, wherein, for each of the perpetual futures contracts, termination comprises one of cash settlement and delivery.

6. The method of claim 1, wherein the allowable termination times comprise at least a first date, a subsequent second date, and a subsequent third date.

7. The method of claim 1, wherein the notifications represent desires by holders of the perpetual futures contracts to settle the contracts.

8. The method of claim 1, wherein the matching is performed by a third-party computer system in communication with the exchange computer system.

9. The method of claim 1, further comprising: removing, by the exchange computer system, the information associated with a perpetual futures contract after the successful matching step.

10. The method of claim 1, further comprising: pricing, by the exchange computer system, the perpetual futures contracts using a forward point adjustment.

11. An exchange computer system comprising:

a computer processor;

a tangible computer memory storing computer-executable instructions, which when executed by the processor, cause the exchange computer system to perform steps comprising:

storing information associated with perpetual futures contracts, wherein the stored information comprises information indicating allowable termination times, receiving notifications of intent to terminate a portion of the perpetual futures contracts, wherein each perpetual futures contract in a first subset of the portion represents a first position and each perpetual futures contract in a second subset of the portion represents a second position, wherein the first position is one of a long or a short position and the second position is the other of a long or a short position, and wherein there are more perpetual futures contracts in the first subset than in the second subset, determining, by the exchange computer system, that each of the notifications represents an intent to terminate a perpetual futures contract on a current opt-out date that corresponds to an allowable termination time, matching each of the perpetual futures contracts in the second subset with one of the perpetual futures contracts in the first subset, thereby leaving one or more excess perpetual futures contracts of the first subset not matched against a perpetual futures contract of the second subset, performing, by the exchange computer system, one of the following with regard to each of the excess perpetual futures contracts (i) not permitting the excess perpetual futures contract to terminate on the current opt-out date, or (ii) permitting the excess perpetual futures contract to terminate on the current opt-out date and matching the excess perpetual futures contract with one of the oldest perpetual futures contracts representing the second position, or (iii) permitting the excess perpetual futures contract to terminate on the current opt-out date and matching the excess perpetual futures contract with a randomly selected one of the perpetual futures contracts representing the second position, and transmitting confirmations of the matches.

12. The system of claim 11, wherein the matching is performed by a third-party computer system in communication with the exchange computer system.

13. The system of claim 11, wherein the notifications are received from a remote user terminal, and wherein the confirmations are sent to the remote user terminal.

14. The system of claim 11, wherein the memory further stores computer-executable instructions, which when executed by the processor, cause the exchange computer system to perform steps comprising:

providing identifiers corresponding to the perpetual futures contracts, providing the allowable termination dates, and providing current prices of the perpetual futures contract.

15. The method of claim 1, wherein each of the excess perpetual futures contracts is not permitted to terminate.

16. The method of claim 1, wherein each of the excess perpetual futures contracts is matched with one of the oldest perpetual futures contracts representing the second position.

17. The method of claim 1, wherein each of the excess perpetual futures contracts is matched with a randomly selected one of the perpetual futures contracts representing the second position.

18. The exchange computer system of claim 11, wherein each of the excess perpetual futures contracts is not permitted to terminate.

19. The exchange computer system of claim 11, wherein each of the excess perpetual futures contracts is matched with one of the oldest perpetual futures contracts representing the second position.

20. The exchange computer system of claim 11, wherein each of the excess perpetual futures contracts is matched with a randomly selected one of the perpetual futures contracts representing the second position.

21. A tangible computer-readable medium storing computer-executable instructions, which when executed by an exchange computer system comprising one or more computers, cause the exchange computer system to perform steps comprising:

storing information associated with perpetual futures contracts, wherein the stored information comprises information indicating allowable termination times;

receiving notifications of intent to terminate a portion of the perpetual futures contracts, wherein each perpetual futures contract in a first subset of the portion represents a first position and each perpetual futures contract in a second subset of the portion represents a second position, wherein the first position is one of a long or a short position and the second position is the other of a long or a short position, and wherein there are more perpetual futures contracts in the first subset than in the second subset;

determining, by the exchange computer system, that each of the notifications represents an intent to terminate a perpetual futures contract on a current opt-out date that corresponds to an allowable termination time;

matching each of the perpetual futures contracts in the second subset with one of the perpetual futures contracts in the first subset, thereby leaving one or more excess perpetual futures contracts of the first subset not matched against a perpetual futures contract of the second subset;

performing, by the exchange computer system, one of the following with regard to each of the excess perpetual futures contracts
  (i) not permitting the excess perpetual futures contract to terminate on the current opt-out date, or
  (ii) permitting the excess perpetual futures contract to terminate on the current opt-out date and matching the excess perpetual futures contract with one of the oldest perpetual futures contracts representing the second position, or
  (iii) permitting the excess perpetual futures contract to terminate on the current opt-out date and matching the excess perpetual futures contract with a randomly selected one of the perpetual futures contracts representing the second position; and transmitting confirmations of the matches.

* * * * *